United States Patent [19]

Shen et al.

[11] Patent Number: 5,481,594

[45] Date of Patent: Jan. 2, 1996

[54] AUDIO CALLER IDENTIFICATION UNIT

[75] Inventors: Francis N. Shen; Anthony P. Shen, both of Unionville; Eric C. Edwards, Maple; Gerrard B. Schmid; Grigor K. Kotzev, both of Toronto, all of Canada

[73] Assignee: Aastra Corporation, Downsview, Canada

[21] Appl. No.: 103,450

[22] Filed: Aug. 6, 1993

[51] Int. Cl.⁶ ................................................ H04M 1/64
[52] U.S. Cl. ........................ 379/67; 379/142; 379/127; 379/392
[58] Field of Search ......................... 379/67, 88, 89, 379/393, 201, 392, 207, 211, 193, 70, 372, 373, 127, 10, 264, 34, 374, 100, 92, 95, 97, 94, 112, 142, 199; 360/62

[56] References Cited

U.S. PATENT DOCUMENTS

| | | | |
|---|---|---|---|
| 4,468,541 | 8/1984 | Cohen | 379/393 |
| 4,894,861 | 1/1990 | Fujioka | 379/374 |
| 4,899,358 | 2/1990 | Blakley | 379/67 |
| 4,922,490 | 5/1990 | Blakley | 370/110.1 |
| 5,007,076 | 4/1991 | Blakley | 379/67 |
| 5,029,200 | 7/1991 | Haas et al. | 379/89 |
| 5,111,501 | 5/1992 | Shimanuki | 379/88 |
| 5,121,423 | 6/1992 | Morihiro et al. | 379/142 |
| 5,153,906 | 10/1992 | Akiyama | 379/112 |
| 5,163,087 | 11/1992 | Kaplan | 379/94 |
| 5,200,994 | 4/1993 | Sasano et al. | 379/142 |
| 5,265,145 | 11/1993 | Lim | 379/88 |
| 5,276,731 | 1/1994 | Arbel et al. | 379/100 |
| 5,283,818 | 2/1994 | Klausner | 379/88 |
| 5,349,638 | 9/1994 | Pitroda et al. | 379/142 |

Primary Examiner—Jeffery A. Hofsass
Assistant Examiner—Scott Wolinsky
Attorney, Agent, or Firm—Merchant, Gould, Smith, Edell, Welter & Schmidt

[57] ABSTRACT

An audio caller identification unit is connected between a user's telephone and a telephone exchange providing calling party identification, such as calling number or name. The unit has user accessible audio inputs, either a microphone or an interface to a handset of the telephone. The unit also has audio message memory, a user programmable table of concordance for tacking the location of audio messages, a record/playback device, a speaker, and a controller. The unit may also have a visual display. Control keys may be connected to the controller, however their function may also be performed by using a keypad of the telephone. A speech generator may also be connected to the controller and to the speaker. In operation, the unit has programming, review, and monitoring modes. In the monitoring mode, the unit recognizes the number of a calling party (decoded from calling number delivery, call display, or similar network-to-terminal signals on phone lines) by reviewing the table of concordance, finds the appropriate message for that number and plays aloud the message stored for that calling party's number either through the speaker or the handset. The unit also stores information about the call for later recovery, possible from a remote location. In programming mode, the control keys are used to prepare the unit to receive audio messages from the microphone or handset. The unit stores the messages and programs the table of concordance.

50 Claims, 4 Drawing Sheets

AUDIO CALLER IDENTIFICATION UNIT

FIELD OF THE INVENTION

The invention relates to the identification of calling parties on telephone systems.

BACKGROUND OF THE INVENTION

As program controlled switching stations have evolved, a number of custom calling features have been developed, including incoming calling line identification. This feature displays the calling party's number to a display unit, allowing selective acceptance of certain calls while other calls are either not answered or routed to a message centre.

Sample features for call display units on the market include:

- Memory to store information about the previous incoming calls, including those that were not answered, such as calling party number, time and date;
- Display, scroll and delete functions to remove the information stored in memory;
- The date and time of each call, answered or unanswered; and
- The number of times that a particular number called.

These units typically require the user to walk over and look at the display in order to determine the number of the calling party. As well, customers usually remember only a few numbers that they frequently call so they often cannot identify the party simply from the calling number on the display.

A number of solutions have been proposed.

U.S. Pat. Nos. 5,007,076, 4,922,490, and 4,899,358 to Blakley each disclose a caller identification system at a telephone switch that stores at the switch text representations entered through the called party's telephone keypad of the names corresponding to the numbers of frequent calling parties. When the number of a calling party matches one of the numbers for which a name has been stored then the system converts the name from text to speech and speaks it to the called party through the called party's telephone in the blank time between rings.

U.S. Pat. No. 4,894,861 to Fujioka discloses a single unit integrating a telephone with a call display, speech memory, a text to speech generator and a speaker. The unit stores text representations entered at the called party's telephone keypad of calling party names corresponding to their numbers, converts them to speech when there is a match with a calling party number and speaks them through the speaker.

The use of the keypad for entering text requires the user to understand which numbers or combination of numbers correspond to a given letter and to know the spelling of the calling party's name. Alternatively, a full keyboard can be used, but this would require a custom telephone for the Blakley system or would add to the expense and size of the Fujioka unit.

Speech generators typically have poor sound quality or are relatively expensive. They also have a limited number of 'voices' from which to select and can have difficulty pronouncing all but the simplest of names.

Existing units do not provide for remote access of stored calling party information. Those with display only capability cannot interface with remote telephones to provide information. Fujioka cannot open the telephone line and therefore cannot accept a telephone call without a user being at the unit.

SUMMARY OF THE INVENTION

In one aspect, the invention provides an audio calling party identification unit for connection to a telephone line. The unit has a line input for receiving an identifying portion of a telephone call on the line from a calling party. It also has an audio input accessible to a user of the unit to input an audio message. Them is storage for an audio message in audio form. A recording device provides recording into storage of an audio message received from the audio input. A user programmable table of concordance contains the location of an audio message in the storage and a corresponding identifying portion of a user anticipated calling party. There is an audio output and a playback device for replaying messages from storage.

The unit deciphers the identifying portion of a calling party telephone call, searches the table of concordance to determine the location of corresponding audio messages and plays back the corresponding audio messages from the storage through the audio output.

The line input may have a controller to decipher the identifying portion of the calling party telephone call and search the table of concordance.

The audio input may have a controller and a telephone line interface. The controller would receive audio messages from the user and pass them to the recording device for storage. A microphone connected to the recording device may be part of the audio input.

A telephone may be connected to the controller. The controller would record audio messages from the telephone. The controller may also receive audio messages from the line.

Control keys may be used to send signals to the controller to place the unit in a program mode for programming the table of concordance according to user instructions. The control keys can be signals received from the telephone, possibly touchtone signals. Alternatively, the control keys may be signals received from the line, possibly touchtone signals, or signals from a keypad.

The recording device and the playback device can be one unit, possibly a solid state recorder.

The audio output may have a speaker. Alternatively, the audio output may use a telephone line interface and a controller. The playback device would play back messages through the interface and the controller to the line.

A microcontroller and memory can form part of the controller. The microcontroller would control the operation of the unit according to instructions stored in the memory. The controller can also have a demodulator for connection to the line and decoding of calling party signals on the line into a serial digital data bit stream for the microcontroller. A receiver decoding touchtone signals can form part of the controller. A relay could be used to selectively provide a ringing signal to the telephone after a call is received and before the call is answered. The controller deciphers the calling party signals, searches the table of concordance and plays back the corresponding audio message while the unit is blocking the ringing signal. Alternatively, the relay can connect a telephone to the line when the user causes the telephone to go off hook. The relay may be connected to a telephone interface to play messages from and record messages to the record/playback device through the telephone.

The calling party number could be displayed by the unit. The unit may have a display driver and a display screen. Calling party information about each call received by the unit could be stored in memory. A voice synthesizer could form part of the unit for converting alphanumeric character messages conveying calling party information stored in memory into speech for playing through the audio output. The character messages might contain prestored messages for play back.

In a second aspect, the invention also provides an audio calling party identification unit for connection to a telephone line. The unit has a line input for receiving, from the line, the telephone number of a calling party and an audio input accessible to a user of the unit to input an audio message. There is also storage for an audio message in audio form and a recording device for recording in audio form into the storage an audio message received from the audio input. A user programmable table of concordance is used for relating the location of an audio message in the storage and a corresponding telephone number of a user anticipated calling party. There is an audio output and a playback device for replaying messages from storage. A microcontroller controls the operation of the unit according to instructions stored in a memory, a receiver decodes touchtone signals and a demodulator connects to the line for decoding of calling party signals on the line into a serial digital data bit stream for the microcontroller. The unit has control keys. A relay can be used to suppress the ringing signal to the phone after a call is received and before the call is answered. The relay connects a telephone to the line when the user causes the telephone to go off hook. The unit deciphers the telephone number of a calling party, searches the table of concordance to determine the location of corresponding audio messages, and plays back the corresponding audio messages from the storage through the audio output while the unit is suppressing the ringing signal to the telephone. The microcontroller receives signals from the control keys and places the unit in a program mode, the unit programs the table of concordance according to user instructions when in program mode.

In a third aspect the invention also provides an audio calling party identification unit for connection to a telephone line. The unit has a line input for receiving from the line an identifying portion of a telephone call placed by a calling party. There is storage for an audio message in audio form and a programmed table of concordance for relating the location of an audio message in storage to a corresponding identifying portion of a user anticipated calling party telephone call. There is an audio output and a playback device for replaying messages from storage. The unit deciphers the identifying portion of a calling party telephone call, searches the table of concordance to determine the location of corresponding audio messages, and plays back the corresponding audio messages from the storage through the audio output.

The unit may store audio messages, and the table may be programmed, prior to sale of the unit.

BRIEF DESCRIPTION OF THE DRAWINGS

For a better understanding of the present invention and to show more clearly how it may be carried into effect, reference will now be made, by way of example, to the accompanying drawings which show the preferred embodiment of the present invention and in which.

DETAILED DESCRIPTION OF THE PREFERRED EMBODIMENT

Figure 1:
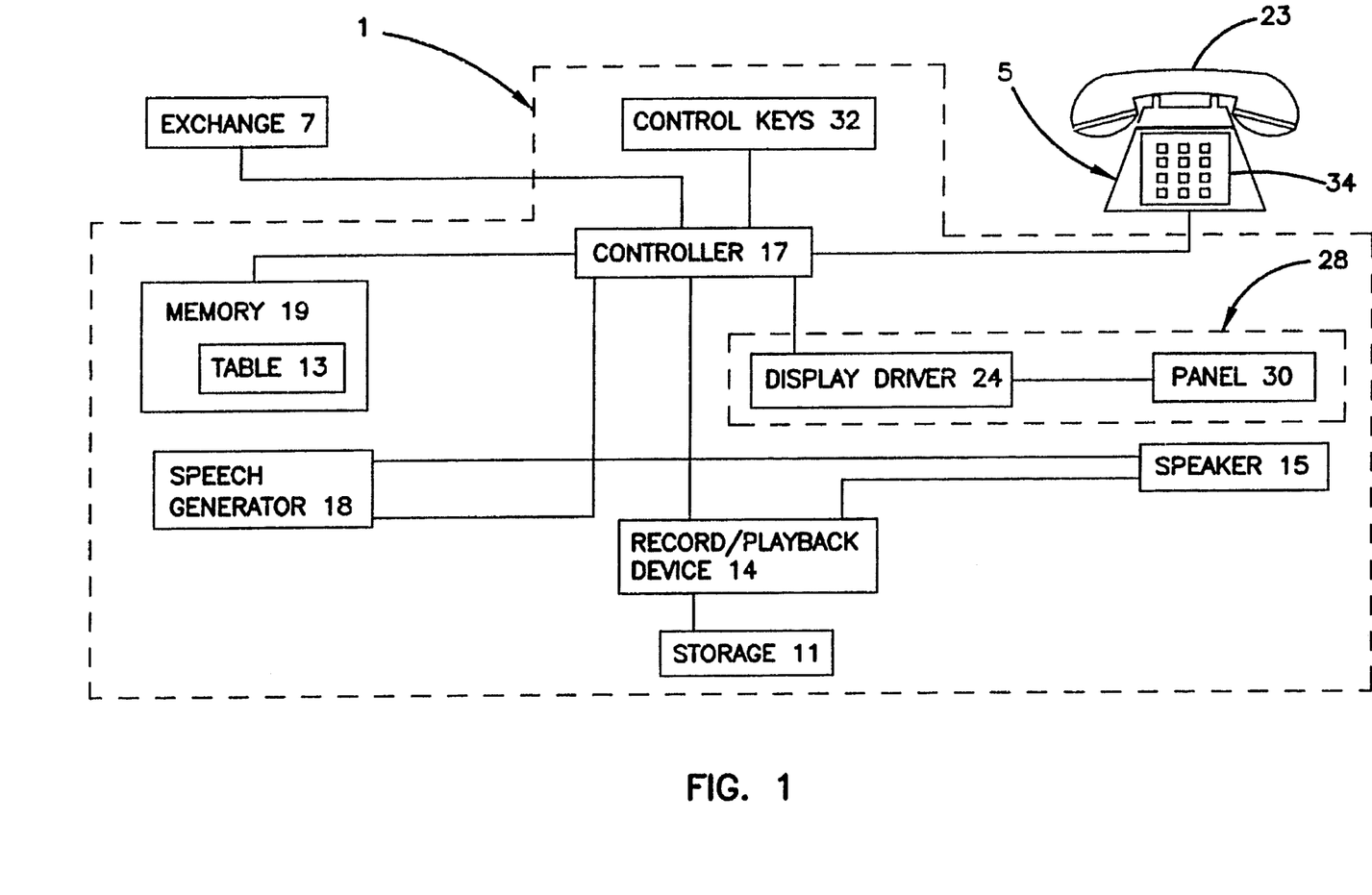
FIG. 1 is a block diagram of an audio caller identification unit according to the preferred embodiment of the present invention connected between a telephone exchange and a user's telephone.

Referring to FIG. 1, audio caller identification unit 1 is connected between a line input, shown as an exchange 7, and a user's telephone 5. The exchange 7 may be a conventional telephone exchange or a private branch exchange (PBX), both being encompassed under the term "exchange 7" for the purpose of this description, that provides coded information corresponding to a calling party's number and/or name.

The unit 1 has audio message storage 11, a user programmable table of concordance 13, a record/playback device 14, a speaker 15, and a controller 17. The controller 17 is connected to the exchange 7, through a jack in the unit (not shown, but as is known in the art), and to the storage 11, the record/playback device 14 and the speaker 15.

Figure 3:
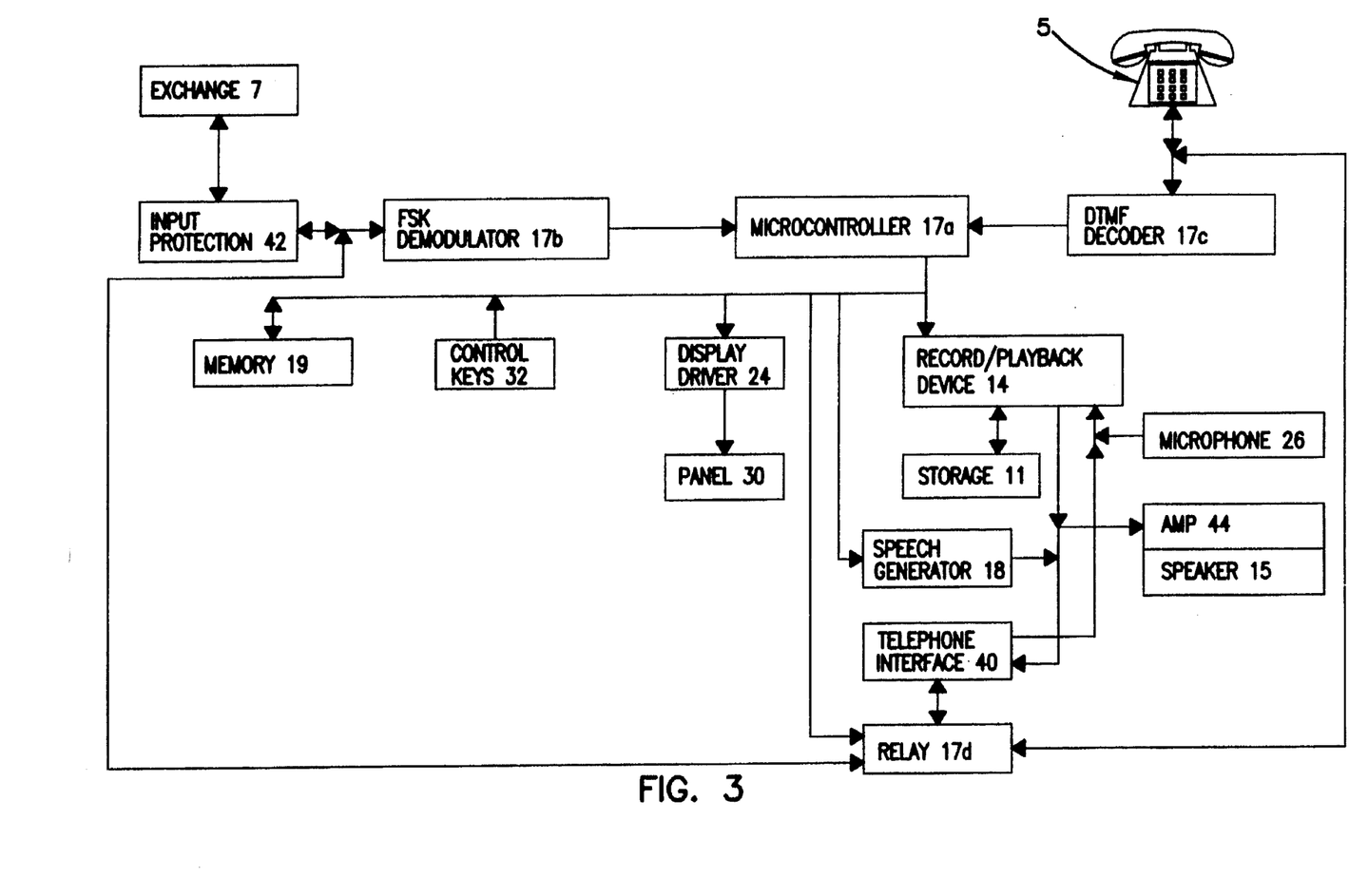
FIG. 3 is a detailed block diagram of the unit of FIG. 1.

The controller 17 forms a user accessible audio input for audio messages from a handset 23 of the telephone 5. Other audio inputs may be used, such as a microphone 26, as shown in FIG. 3, which could form part of the unit 1, or the controller 17 as an input for audio messages from a remote telephone, not shown, calling through the exchange 7. The controller 17 also forms a line input for receiving calling party telephone calls.

The audio message storage 11 is a random access memory (RAM) integrated circuit (for example an Oki Semiconductor MSM6389 Solid State Recorder Data Register), however magnetic tape or another storage medium, not shown, could be used, however their functions may be limited. The record/playback device 14 could be a solid state audio record playback integrated circuit or functionally similar digital recording unit. An example of a device 14 would be an Oki Semiconductor MSM6388 or MSM6588 ADPCM Solid State Recorder. This is a digital adaptive differential pulse code modulation device 14. Alternative technologies include analog RAM devices, such as Information Storage Devices ISD1012A family, including both the device 14 and the audio storage 11.

The table 13 is stored in a general memory 19 connected to the controller 17. If the storage is to be a RAM integrated circuit, the general memory 19 and the audio message storage 11 could use the same integrated circuit with consequent modification, however given the different functions of the storage 11 and the general memory 19, as will be discussed below, it may be easier to keep the storage 11 and general memory separated.

The speaker 15 is an audio output for the unit. An example of another audio output is the telephone line interface 40 through a relay 17d and connected, directly or indirectly, to the exchange 7 and telephone 5 as described below with reference to FIGS. 2 and 3.

Figure 2:
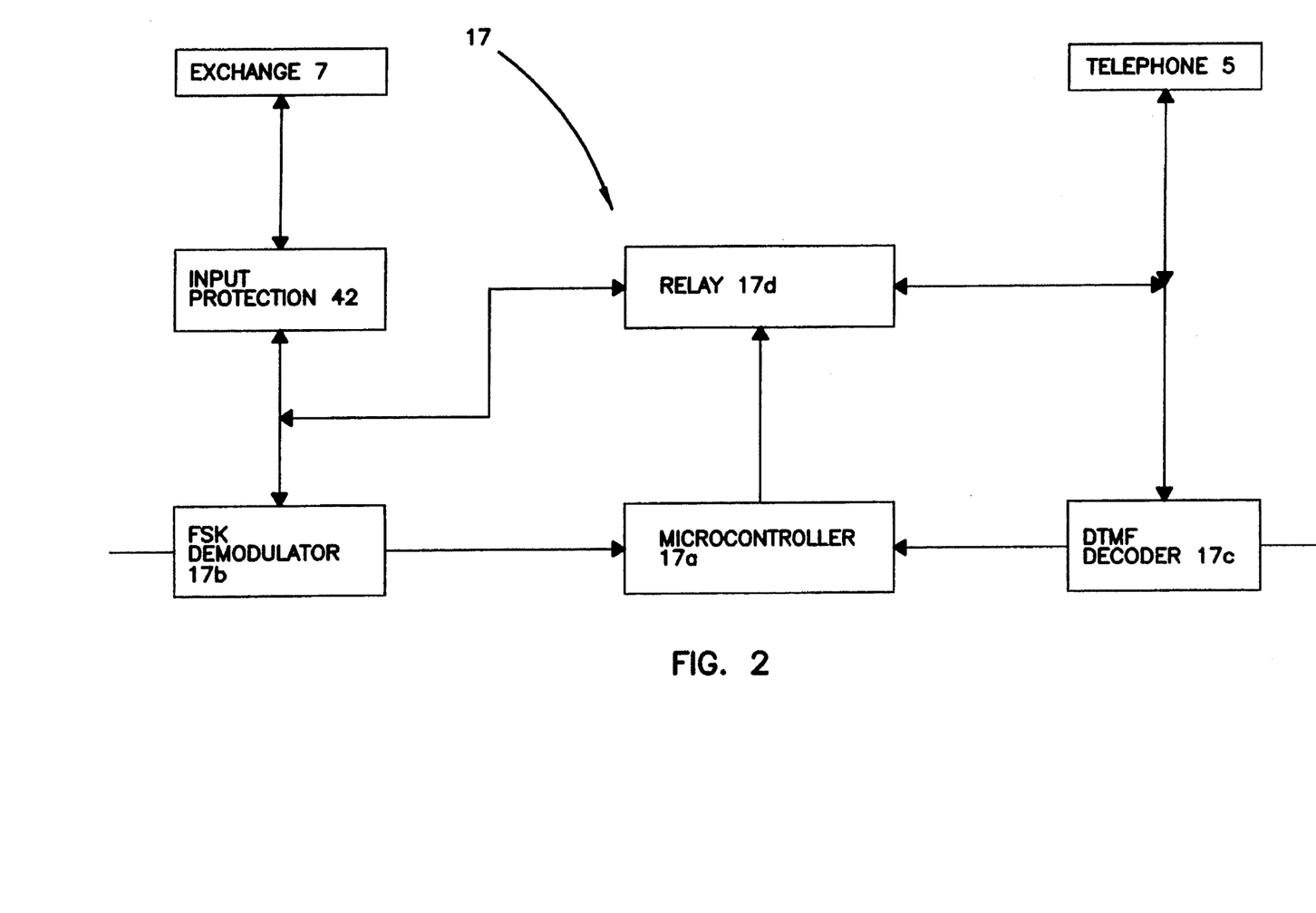
FIG. 2 is a detailed block diagram, of a controller in the unit of FIG. 1.

Referring to FIG. 2, the controller 17 is composed of a microcontroller 17a (for example, a Microchip PIC16C57 or Motorola 8051), connected between an FSK demodulator 17b (for example, Mitel MT8841 or Exar 2211), a DTMF receiver 17c (for example Mitel MT8870D or Sanyo LC7385) and a relay 17d (electromechanical or solid state). The FSK demodulator 17b and relay 17d provide the connection to the exchange 7. The relay 17d and decoder 17c are connected to the telephone 5.

Referring again to FIG. 1, the unit 1 may also have a visual display 28. The display 28 is made up of a panel 30, for example an LCD panel, at least capable of displaying alphanumeric characters. A display driver 24 is connected between the controller 17 and the panel 30.

Control keys 32 may be connected to the controller 17, however their function may also be performed by using a specific code, such as * ... or #. . . at a keypad 34 of the telephone 5 that will be recognized by the controller 17 and operate the unit 1 in programming mode as will be discussed further below. A speech generator 18 may also be connected to the controller 17 and to the speaker 15.

Power to the unit can be provided by a battery or AC adapter, not shown.

Referring to FIG. 3, the details of the controller 17 have been added to the block diagram of FIG. 1. A phone line interface 40 is connected to the device 14 and the relay 17d. The interface 40 could be a Cermetek Telephone Line Interface Module, also known as a DAA, CH1817. Input protection 42 is connected between the exchange 7, the relay 17d and the demodulator 17b in a manner known in the art.

In operation, the microcontroller 17a provides all control, communication and other functions to the other components of the unit 1 according to instructions stored in the microcontroller 17a. The demodulator 17b decodes the incoming calling party signals and presents them to the microcontroller 17a as a serial digital data stream. The decoder 17c decodes touch-tone signals from the keypad 34 and presents them to the microcontroller 17a as digital data. The relay 17d is used to isolate the telephone 5 from the exchange 7 when the unit 1 is in Programming Mode as will be discussed further below.

The unit 1 has programming, review, and monitoring modes. Its basic function is to recognize the number of a caller (decoded from calling number delivery, call display, or similar terminal-to-network interface on phone lines) and to either read the number aloud or to play back a unique stored message assigned to that caller's number. A limited number of these unique messages can be recorded by the user for anticipated calling parties.

All audio playback of audio messages, in any mode, is done through the record/playback device 14. The device 14 is connected to storage 11 that may contain both factory-programmed messages for generic items such as the digits 0 through 9, "Blocked Call" or "Unknown Call", and user messages for customizing responses. The device 14 outputs sound through an audio amplifier 44, not shown in FIG. 1 but shown in FIG. 3, to the speaker 15. Depending on the device 14 used, a separate amplifier 44 may not be required, but would form part of the device 14.

Figure 4:
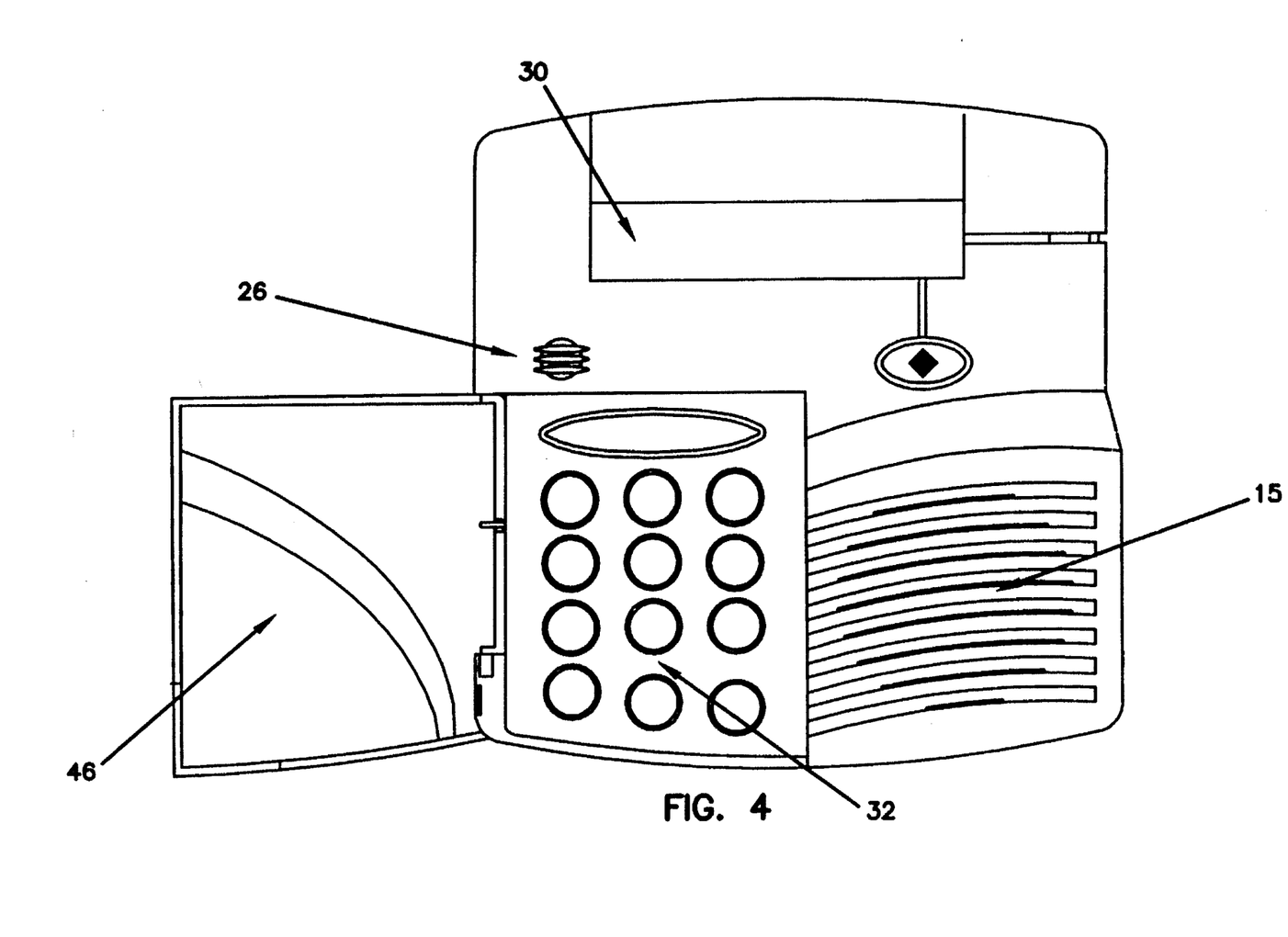
FIG. 4 is a plan view of the upper face of the unit according to the invention.

All user message recording is performed through the device 14. The device 14 is connected to storage 11 that permits the recording and retrieval of customized messages. The device 14 receives sound through the microphone 26 or the handset 23 through the interface 40 and places it in storage 11 under the control of the microcontroller 17a.
Programing Mode To program the unit 1, a user will press one of the control keys 32 on the unit 1 or dial a specific code on the keypad 34. In order to operate the telephone 5 in this manner the telephone 5 must be in tone mode. For ease of use, the unit 1 may have a door 46, shown, in FIG. 4 over the control keys 32 that automatically sends a signal to the microcontroller 17a to place the unit 1 in programming mode when the door is opened.

In programming mode, the unit 1 will disconnect the telephone 5 from the exchange 7 line and supply power to it. The microcontroller 17a activates the relay 17d to disconnect the telephone 5 from the exchange 7 and the interface 40 supplies power to the telephone 5 through relay 17d. The user may (optionally) be prompted at the display 28 or over the telephone 5 to enter a password through the keypad 34 or the control keys 32. The user will then be prompted to enter the number of a calling party. If the number is already assigned to an audio message, then the user will be given the option of reviewing the message, deleting or changing the message, or returning to Monitoring Mode. If the user elects to record a message then the user speaks the message into a microphone 26 or through the handset 23 following a prompt. The message may be limited to a length of less than six seconds. If the handset 23 is to be used for recording or prompts to the user then the relay 17d will connect the telephone 5 to the device 14 through the interface 40. After recording a message, the user will again be given the choice of reviewing the message, recording a new message, or returning to monitoring mode.

If there is insufficient memory for further messages, the user will be informed via display 28 or the handset 23.

When programming is complete, unit 1 will re-connect the phone to the exchange 7 line. When the user programs the unit 1, the user provides an anticipated calling party number at the keypad 34 or the control keys 32 and a corresponding audio message through the handset 23 or the microphone 26. The calling party number is added to the table of concordance 13 and assigned a message number. The audio message is converted to digital data, maintaining the audio form of the message, by the device 14 and stored in a block of storage 11. The message numbers correspond to numbers for the audio memory blocks. The blocks can be of fixed lengths providing typically 6 seconds of audio recording capacity.

Programming may also be done remotely from a telephone, not shown, using the remote keypad and handset for the remote telephone, not shown. The access is described more fully under Review Mode below.
Review Mode This mode will allow the user to either review the stored messages or to review the information from incoming calls stored in memory in the same manner as they are reviewed in programming mode, but without the ability to change a message unless programming mode is entered.

For stored messages, the unit 1 will allow the user to use the control keys 32 and display on the display 28 or read aloud to the speaker 15 or handset 23 from memory 19 the calling party numbers that are assigned to messages and to play back the corresponding message from storage 11 to the speaker 15 or handset 23. The user may then directly enter program mode to review, change or delete messages as described previously, then return to Review Mode. If deletion is selected then the message and the calling party number will be removed from memory 19 and storage 11. Selecting change will allow a new audio message to be recorded in the block corresponding to that calling party number. Selecting review will allow the user to listen to the message.

For incoming call information, the unit 1 will allow the user to list on the display 28, or over the handset 23 or the speaker 15, the information from incoming calls which are stored in memory 19. The user can move from one call's information to the next by pressing the control keys 32. The unit 1 may also allow continuous sequential listing of information from incoming calls. For each call, this may include any or all of:

time of call date of call name of caller (where name delivery is available)

calling party number number of times that calling party called.

The unit 1 will store this information in general memory 19 for each incoming call, up to some maximum number of calls. The user may clear the general memory 19 of incoming call data during the review of information from incoming calls.

As the unit 1 can deliver a signal to the exchange 7 line, the unit 1 could also read the recorded call information over a phone line when interrogated by the user from a remote location. The user would access unit 1 by calling the number to which unit 1 is connected, after which unit 1 would open the line after a prescribed number of rings. The user might then be required to enter a security code. Unit 1 would then read out all call information in its memory 19 over the phone line to the interrogating party. The user might be required to use the keypad of his/her phone to access specific information in memory 19. This could be done by routing the exchange 7 line through the relay 17d and the decoder 17c to decode touchtone signals. Unit 1 might note the time of the user's call and only read off new calls during subsequent interrogation. Unit 1 could be set up to not open the line when the user initially calls, if there have been no calls to unit 1 since the previous interrogation, for purposes of saving on long distance costs at the user's end.

Monitoring Mode

If the user does not activate any of unit 1's functions for a given time interval while the unit 1 is in Programming Mode, then the unit 1 will automatically revert to Monitoring Mode. Additionally, the user may command the unit 1 while the unit 1 is in Programming Mode to return to Monitoring Mode using the control keys 32.

In Monitoring Mode, unit 1 is dormant until an incoming call arrives. The unit 1 then decodes the information presented by the network-to-terminal signals after the first ring package or sequence of rings that announces an incoming call. Some multiple number services send ring signals that are a group of two or three closely spaced rings separated by a silent period, instead of the usual single ring with a silent pause. The unit 1 stores the calling party number, the time and date of the call, and the calling party's name (if included in the network-to-terminal signals) in the memory 19. The unit 1 then compares the calling party's number with those assigned in the table 13 to messages in storage 11. If a match is found, then the message number is noted and the corresponding message is played aloud on speaker 15. The microcontroller 17a either calculates or looks up in a permanent table, not shown, the memory address corresponding to the message number and provides the address to the device 14 which plays back the message. If no match is found, then the calling party's number is simply read aloud over the speaker 15, using a pre-recorded message from storage 11 for each digit in the number, or each digit could be pronounced using the speech generator 18. If the number is unavailable or long distance then an appropriate message can also be played that may be factory recorded if desired.

Alternatively, the actual memory locations in storage 11 for messages, i.e. the start and end locations, may be recorded in the table 13 with the calling party number when the user programs the unit 1. When a call is received and a match found in the table 13 then the message recorded at the location stored in the table 13 would be played. This permits the recording of messages of varying length. The telephone 5 may be disabled while the message is read so that the telephone 5 will not ring at that time. Unit 1 may also announce from storage messages corresponding to pertinent information from the network-to-terminal signals or information derived from searching memory 19, such as "Long Distance Call", "Unknown Call", or "Blocked Call".

In Monitoring Mode, the controller 17 decodes the incoming name/number data from the incoming FSK signal and converts it to digital data. This data is then stored in memory 19 and also used in the audio message/number playback, as previously described.

After a message is read, the telephone 5 may resume tinging as normal. Alternatively, the unit could provide a ringing sound or some other indication of a call on the exchange 7 line. The calling party's phone number, name (if available), and other relevant information will be presented on the alphanumeric display at the same time. The unit 1 will then return to Monitoring Mode. The message or number may be read aloud more than once.

The unit 1 could be adapted to process the name of the calling party from the terminal-to-network interface signals (where provided) and read the name of the caller aloud. The sound could be generated using DSP, speech synthesis, or similar technology. In this case the device 14 would be bypassed when using speech synthesis, however it 14 would still be useful for a user to employ a voice that the user likes, for example that of a voice model or company receptionist, or to record and replay names that the generator 18 has difficulty pronouncing.

It will be understood by those skilled in the art that this description is made with reference to the preferred embodiment and that it is possible to make other embodiments employing the principles of the invention which fall within its spirit and scope as defined by the following claims. For example, a simplified version of the unit could be produced which is not programmable by the user and only has factory programmed messages for generic items such as the digits 0 through 9, "Blocked Call" or "Unknown Call". Such a unit would not require a recording device or audio input. It would be relatively inexpensive.

We claim:

1. An audio calling party identification unit for connection to a telephone line, the unit comprising:

A. a line input for receiving from the telephone line an identifying portion of a telephone call placed by a calling party;

B. an audio input to input an audio message prior to receiving an anticipated telephone call;

C. storage for the audio message in audio form;

D. a recording device for recording in audio form into the storage the audio message received from the audio input;

E. a programmable table of concordance in a memory separate from the storage for the audio message, for relating the location of the audio message in storage to a corresponding identifying portion of the anticipated telephone call;

F. an audio output; and

G. a playback device for replaying audio messages from storage; and

H. means for suppressing a ringing signal to a called party telephone after a call is received by the unit and before the call is answered at the telephone;

wherein the unit is adapted to decipher the identifying portion of a calling party telephone call, search the table of concordance to determine the location of corresponding audio messages, and to play back to a called party the audio message corresponding to the calling party from the storage through the audio output.

2. The unit according to claim 1, wherein the line input comprises a controller adapted to decipher the identifying portion of the calling party telephone call and search the table of concordance.

3. The unit according to claim 1, wherein the audio input comprises a controller and a telephone line interface, wherein the controller receives audio messages from the audio input and passes them through the interface to the recording device for storage.

4. The unit according to claim 1, wherein the audio input comprises a microphone connected to the recording device.

5. The unit according to claim 1, wherein the unit is adapted to be connected to a telephone and the recording device is adapted to record audio messages from the telephone.

6. The unit according to claim 1, wherein the recording device is adapted to record audio messages from the telephone line.

7. The unit according to claim 2, further comprising control keys, and wherein the controller is adapted to receive signals from the control keys and to place the unit in a programming mode, the unit adapted to program the table of concordance according to user instructions when in programming mode.

8. The unit according to claim 7, wherein the controller is adapted to receive signals from a called party telephone to place the unit in programming mode and program the table of concordance.

9. The unit according to claim 8, wherein the signals from the called party telephone are touchtone signals.

10. The unit according to claim 7, wherein the controller is adapted to receive signals from the telephone line to place the unit in programming mode and program the table of concordance.

11. The unit according to claim 10, wherein the signals on the telephone line are touchtone signals.

12. The unit according to claim 7, further comprising a keypad and wherein the control keys are on a keypad.

13. The unit according to claim 7, further comprising a door over the control keys and wherein the unit is adapted to automatically place the unit into programming mode when the door is opened.

14. The unit according to claim 1, wherein the record device and the playback device are one record/playback device.

15. The unit according to claim 14, wherein the record/playback device is a solid state recorder.

16. The unit according to claim 1, wherein the audio output comprises a speaker.

17. The unit according to claim 1, wherein the audio output comprises a telephone line interface and a controller, and wherein the playback device plays back the audio messages to the called party telephone through the interface and the controller the telephone.

18. The unit according to claim 2, wherein the controller comprises a microcontroller and memory, the microcontroller controlling the operation of the unit according to instructions stored in the memory.

19. The unit according to claim 18, wherein the controller further comprises a demodulator for connection to the line and decoding of calling party signals on the telephone line into a serial digital data bit stream for the microcontroller.

20. The unit according to claim 18 or 19 wherein the controller further comprises a receiver for decoding touchtone signals.

21. The unit according to claim 2, wherein the controller further comprises said means for suppressing a ringing signal, and wherein the controller deciphers calling party signals on the telephone line to determine the identifying portion of the telephone call, searches the table of concordance and plays back the corresponding audio message while suppressing the ringing signal to the called party telephone during playback of the audio message.

22. The unit according to claim 21, wherein said means for suppressing is a relay adapted to connect the telephone to the telephone line when the user causes the telephone to go off hook.

23. The unit according to claim 21, wherein said means for suppressing is a relay connected to a telephone interface and the unit is adapted to play messages from and record messages to the record/playback device through the telephone interface and the relay.

24. The unit according to claim 1, further comprising a display for displaying calling party information derived from the identifying portion of the telephone call.

25. The unit according to claim 24, wherein the display comprises a display driver and a display screen.

26. The unit according to claim 2, wherein the controller stores in memory calling party information about each call received by the unit.

27. The unit according to claim 26, wherein the audio output comprises a telephone fine interface and a controller, the playback device playing back messages through the interface and the controller to the telephone line.

28. The unit according to claim 1, further comprising a speech generator for converting text messages conveying calling party information stored in memory into audio for playing through the audio output.

29. The unit according to claim 28, wherein the text messages contain pre-stored messages for playback.

30. The unit according to claim 1, wherein the identifying portion is the telephone number of the calling party.

31. The unit according to claim 1, wherein the identifying portion is the name of the calling party.

32. The unit according to claim 1, wherein the unit is a standalone unit from a called party telephone.

33. The unit according to claim 1, wherein the storage for the audio message is capable of storing audio messages of varying lengths.

34. The unit according to claim 1, wherein the audio input is accessible to the called party so that the called party may record, during programming mode, the audio message in audio form corresponding to an identifying portion of an anticipated calling party telephone call, the location of the audio message being programmed into the table of concordance.

35. The unit according to claim 34, wherein the audio output comprises a speaker.

36. The unit according to claim 35, wherein the audio input comprises a microphone connected to the recording device.

37. The unit according to claim 36, wherein a ringing signal to the called party is suppressed during playback of the audio message.

38. The unit according to claim 37, further comprising a display for displaying calling party information derived from the identifying portions of the calling party telephone call.

39. The unit according to claim 38, further comprising control keys for sending signals to place the unit into the programming mode and to program the table of concordance according to user instructions when in the programming mode.

40. The unit according to claim 39, wherein the audio output comprises a telephone line interface and a controller, and wherein the playback device is for playing back the audio messages through the interface and the controller to a called party.

41. The unit according to claim 40, wherein the controller comprises a microcontroller and memory, the microcontroller controlling the operation of the unit according to instructions stored in the memory.

42. The unit according to claim 41, wherein the controller further comprises a demodulator for connection to the telephone line and for decoding of calling party signals on the telephone line into a serial digital data bit stream for the microcontroller.

43. The unit according to claim 42, wherein the controller further comprises a receiver for decoding touchtone signals.

44. The unit according to claim 43, further comprising a speech generator for converting text messages conveying calling party information stored in memory into audio for playing through the audio output.

45. The unit according to claims 34, 35, 36, 37, 38, 39, 40, 41, 42, 43 or 44 wherein the identifying portion comprises the telephone number of the calling party.

46. The unit according to claims 34, 35, 36, 37, 38, 39, 40, 41, 42, 43 or 44 wherein the identifying portion comprises the telephone name of the calling party.

47. The audio calling party identification unit according to claim 34, 35, 36, 37, 38, 39, 40, 41, 42, 43 or 44, wherein the unit is a standalone unit from a called party telephone.

48. The unit according to claim 1 or 34 wherein the storage contains factory generated audio messages.

49. An audio calling party identification unit for connection to a telephone line, the unit comprising:
   A. a line input for receiving, from the telephone line, the telephone number of a calling party;
   B. an audio input for receiving an audio message prior to receipt of an anticipated telephone call;
   C. storage for the audio message in audio form;
   D. a recording device for recording in audio form into the storage the audio message received from the audio input;
   E. a user programmable table of concordance in a memory separate from the storage for the audio message, for relating the location of the audio message in the storage and a corresponding telephone number of a user anticipated calling party;
   F. an audio output; and
   G. a playback device for replaying audio messages from storage;
   H. a microcontroller and memory, the microcontroller controlling the operation of the unit according to instructions stored in the memory;
   I. a receiver decoding touchtone signals;
   J. a demodulator for connection to the telephone line and decoding of calling party signals on the telephone line into a serial digital data bit stream for the microcontroller;
   K. control keys;
   L. a relay for suppressing a ringing signal to a called party telephone after a call is received by the unit and before the call is answered at the telephone, during playback of the audio message, the relay being adapted to connect the telephone to the telephone line when the called party causes the telephone to go off hook;
wherein the unit is adapted to decipher the telephone number of a calling party from calling party signals, search the table of concordance to determine the location of the corresponding audio messages, and to play back the corresponding audio messages from the storage through the audio output while the unit is suppressing the ringing signal to the telephone, wherein the microcontroller is adapted to receive signals from the control keys to place the unit in a programming mode, the unit being adapted to program the table of concordance according to user instructions when in the programming mode.

50. The unit according to claim 1 or 49, wherein information concerning an incoming call is retained in the memory separate from the storage for the audio message, the unit further comprising means for permitting access to the memory separate from the storage for the audio message from a remote location.

* * * * *